US009940203B1

(12) United States Patent
Ghatnekar et al.

(10) Patent No.: US 9,940,203 B1
(45) Date of Patent: Apr. 10, 2018

(54) UNIFIED INTERFACE FOR CLOUD-BASED BACKUP AND RESTORATION

(71) Applicant: EMC Corporation, Hopkinton, MA (US)

(72) Inventors: Anand S. Ghatnekar, Pune (IN); Kedar S. Patwardhan, Irvine, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 299 days.

(21) Appl. No.: 14/737,286

(22) Filed: Jun. 11, 2015

(51) Int. Cl.
*G06F 17/30* (2006.01)
*G06F 11/14* (2006.01)
*H04L 29/08* (2006.01)

(52) U.S. Cl.
CPC ...... *G06F 11/1448* (2013.01); *G06F 11/1464* (2013.01); *G06F 17/30091* (2013.01); *G06F 17/30203* (2013.01); *H04L 67/1097* (2013.01); *G06F 2201/84* (2013.01)

(58) Field of Classification Search
CPC .............. G06F 11/1451; G06F 11/1464; G06F 11/1458; G06F 11/1469; G06F 11/1453; G06F 11/1412; G06F 11/2094; G06F 11/1461; G06F 2201/84; G06F 2201/80; G06F 17/30088; G06F 17/30138
See application file for complete search history.

(56) References Cited

U.S. PATENT DOCUMENTS

| | | | | |
|---|---|---|---|---|
| 9,158,804 | B1* | 10/2015 | Rangapuram | G06F 17/30575 707/E17.004 |
| 9,354,983 | B1* | 5/2016 | Yenamandra | G06F 11/1464 707/E17.044 |
| 2006/0218435 | A1* | 9/2006 | van Ingen | G06F 11/1451 714/6.12 |
| 2009/0259701 | A1* | 10/2009 | Wideman | G06F 17/30156 711/E12.001 |
| 2010/0318782 | A1* | 12/2010 | Auradkar | G06F 11/1451 711/162 |
| 2010/0318812 | A1* | 12/2010 | Auradkar | G06F 11/1464 711/162 |
| 2010/0332401 | A1* | 12/2010 | Prahlad | G06F 17/30082 711/162 |
| 2010/0333116 | A1* | 12/2010 | Prahlad | G06F 17/30082 709/216 |
| 2011/0252071 | A1* | 10/2011 | Cidon | G06F 17/30174 707/802 |

(Continued)

*Primary Examiner* — Anh Ly
(74) *Attorney, Agent, or Firm* — Womble Bond Dickinson (US) LLP

(57) ABSTRACT

A cloud gateway (GW) device receives a first request for incremental backup from a client device over a LAN, where the first request includes a first file representing a difference between the incremental backup in view of a prior backup. In response, the cloud GW identifies a first base backup previously backed up to a cloud storage server over a WAN. A second request is transmitted to the cloud storage server over the WAN to copy the first base backup into a second base backup. A third request is transmitted to the cloud storage server over the WAN to replace a second file within the second base backup. The third request includes a second backup ID, a descriptor describing the file to be replaced, and content of the file received from the client without modifying the first file.

18 Claims, 8 Drawing Sheets

(56) References Cited

U.S. PATENT DOCUMENTS

| | | | |
|---|---|---|---|
| 2012/0179655 A1* | 7/2012 | Beatty | G06F 11/1451 707/646 |
| 2014/0040580 A1* | 2/2014 | Kripalani | G06F 3/065 711/162 |
| 2015/0127607 A1* | 5/2015 | Savage | G06F 17/30194 707/610 |
| 2015/0143064 A1* | 5/2015 | Bhargava | G06F 11/1451 711/162 |
| 2016/0150047 A1* | 5/2016 | O'Hare | G06F 3/0619 713/168 |
| 2016/0274978 A1* | 9/2016 | Strohmenger | G05B 13/04 707/E17.009 |

* cited by examiner

| Tag Key | Tag Value/String |
|---|---|
| Client ID/Name | |
| Full/Incremental Backup | |
| Base Backup ID | |
| Key Words | |
| Other tags | ... |

FIG. 4

UNIFIED INTERFACE FOR CLOUD-BASED BACKUP AND RESTORATION

FIELD OF THE INVENTION

Embodiments of the present invention relate generally to data storage systems. More particularly, embodiments of the invention relate to unified interface for cloud-based backup and restoration.

BACKGROUND

Cloud computing is Internet-based computing, where shared server resources, software, and information are provided to client devices on demand. The server resources, for example, include data storage, processing capabilities, and network bandwidth. The resources are often scalable and virtualized, so that details of resource provisioning are hidden from the cloud computing consumers, who no longer have need for expertise in, or control over, the technology that provides the shared server resources.

Cloud application platforms provide facilities for transitioning legacy applications to cloud computing infrastructures, and providing security, control and compliance over the applications and data in the cloud computing infrastructures. The virtual datacenters are exposed to users through a Web-based portal and the users are provided with a catalog of Information Technology (IT) services that can be deployed within the virtual datacenter. Applications and data can be segmented into trusted zones and security policies can be implemented and monitored for IT compliance.

Enterprises have a keen interest in storing backups in cloud storage to achieve disaster recovery (DR) as well for long term retention for compliance reasons while keeping storage costs to bare minimum. Companies offering backup/restore solutions have been quick to offer solutions that offer tiered storage backed by cloud as well solutions that store backups in cloud. However, all such solutions inherently involve a vendor lock-in since backups stored by one backup vendor cannot be deciphered by a backup solution from another vendor. All this vendor lock-in goes against the interests of customers and clearly a solution is required that allows backup vendors to innovate and provide unique functionality for optimizing backups stored in cloud yet allow any backup software vendor to restore the backup.

In the past an attempt has been made to standardize the storage interface to store backups and read backups stored on various kinds of storage. However the interface deals with interfacing a persistent storage with the backup software. Typically, a backup vendor deploys agents on the client system/s to be backed up. These agents troll through file systems and identify modified files/directories that need to be backed up. Agents may also have data storage format intelligence and work with certain applications or infrastructure components to identify changed data. This changed data is then read, often deduplicated and then stored on the backup media server or shipped directly to cloud in a format, which is proprietary to the backup cloud vendor. During restore, a customer needs to use the restore software provided by the backup vendor to restore a backup. As a customer is locked in with a backup vendor or cloud storage provider.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating an example of a descriptor data structure according to one embodiment of the invention.

DETAILED DESCRIPTION

Figure 1:
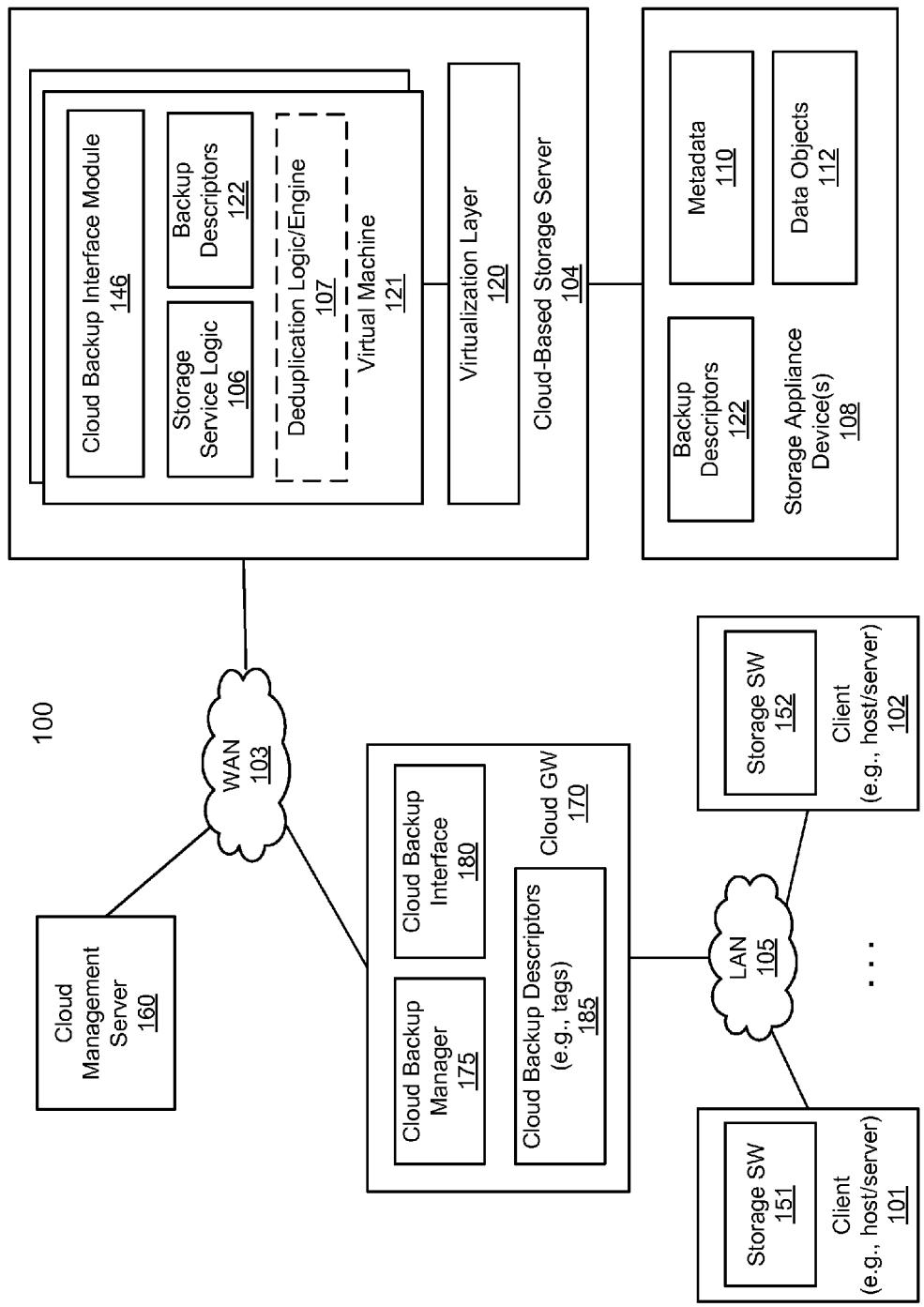
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an open or standardized interface is provided for specifying a backup source to cloud as well for restoring a backup from cloud. To that extent a common application programming interface (API) or protocol is defined and utilized that can accommodate various types of data sources, allow tagging of sub-components of the source data for granular restore and specify a common format for restore full as well as granular backups from cloud. The goal of embodiments of the invention is that a backup/restore to/from cloud service can be implemented through a cloud storage gateway (also simply referred to as a cloud gateway) that manages all backups/restores to/from cloud in a way and format proprietary to the backup vendor.

In one embodiment, the interface allows an agent to identify and tag a backup source. All backups from the same source would have the same tag. Further the agent can identify the backup as a full backup or an incremental backup. Each backup has a version identifier with sufficient information to denote whether it is a full backup with its version or if incremental its version number and the base full backup that is related to. The agent presents modified source data to a backup media server/cloud gateway in blocks or files. Each block has a unique identity within the backup source and has an associated tag for identifying the block.

Each block has sufficient metadata to identify it location in the backup source (e.g. file name, block number, redo-log filename etc.) and the same is preserved by the backup media server/cloud gateway in the backup. The block metadata can also be used to uniquely identify a block for restore during a granular restore. Optionally the backup agent can also specify a list of keywords associated with each block of the source data. The backup media server/cloud gateway indexes the block (if they support indexing) so as to list the block metadata in response to a keyword search request from a client.

The backup media server is free to break up a block into smaller pieces if required till such while that the block can be selectively rehydrated if so demanded during restore. The backup media server is free to store each block on the backup target as it receives it or accumulates a set/all blocks before processing them and storing them on the backup target. The backup agent on its part would create a file (e.g., an XML file) listing all blocks as well as their metadata identifiers (tags) which serves as a catalog for restoring the backup in full or block level granular form. This framework allows for agents from one backup vendor that speak a common language to describe a data source to store data onto any other backup media server/cloud gateway from any other vendor thus preventing a vendor lock-in for customers.

FIG. 1 is a block diagram illustrating a storage system according to one embodiment of the invention. Referring to FIG. 1, system 100 includes, but is not limited to, one or more client systems 101-102 communicatively coupled to cloud GW 170 over local area network (LAN) 105, where cloud GW 170 is coupled to storage system 104 over network 103. LAN 105 may be a local storage network. Network 103 may be a wide area network (WAN) such as the Internet. Although only one cloud storage server 104 is shown, cloud GW 170 may be coupled to multiple cloud storage servers over network 103.

Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system or a local backup server (e.g., local data center) that provides storage to other local clients, which may periodically back up the content stored therein to a backup storage system (e.g., a disaster recovery site or system), such as storage system 104.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and storage appliance device(s) 108 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic and restore logic (not shown). The backup logic is configured to receive and back up data from a client (e.g., clients 101-102) and to store the backup data in storage appliance device 108. The restore logic is configured to retrieve and restore backup data from any one or more of storage units 108-109 back to a client (e.g., clients 101-102).

Storage appliance device 108 may be implemented locally (e.g., single node operating environment) or remotely (e.g., multi-node operating environment) via a bus and/or a network (e.g., a storage network). Storage appliance device 108 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system.

In response to a data file to be stored in storage appliance device 108, according to one embodiment, deduplication logic 107 is configured to segment the data file into multiple segments (also referred to as chunks) according to a variety of segmentation policies or rules. Deduplication logic 107 may choose not to store a segment in storage appliance device 108 if the segment has been previously stored in storage appliance device 108. In the event that deduplication logic 107 chooses not to store the segment in storage appliance device 108, it stores metadata enabling the reconstruction of the file using the previously stored segment. As a result, segments of data files are stored in a deduplicated manner as part of data objects 112 of storage appliance device 108. The metadata, such as metadata 110, may be stored in at least some of storage units of storage appliance device 108, such that files can be accessed independent of another storage unit. Metadata of each storage unit includes enough information to provide access to the files it contains.

In one embodiment, storage server 104 is configured and operates as a cloud storage server to provide cloud storage services to clients. Storage server 104 can be accessed using a variety of communication protocols, such as, representational state transfer (REST). A cloud storage service permits a user to upload and store files at a remote Internet site, and later retrieve and download the files. Storage service logic or engine 106 and deduplication logic or engine 107 may be hosted in virtual machine (VM) 121 and virtualized by virtualization layer 120.

A virtual machine encapsulates an entire server or desktop computer environment so that multiple virtual machines can be hosted in a single network server in such a way that the environment of the network server is hidden from applications executed on the virtual machine. Typically this is done by installing a virtualization layer, such as virtualization layer 130, on the network server and then layering the virtual machines over the virtualization layer. The virtualization layer abstracts and allocates processor, memory, storage, and networking resources to each virtual machine. The virtualization layer also isolates the virtual machines from each other so that a crash or configuration error in one virtual machine does not affect the other virtual machines.

Each virtual machine, for example, is a software appliance encapsulated in a file in accordance with a standard Virtual Machine Disk Format (VMDK). In general, a software appliance is a full application stack containing an operating system, application software, and any configuration and data files required to operate the application software and the operating system. The encapsulation of a virtual machine in a file permits the virtual machine to be migrated from one network server to another in a file migration process.

In one embodiment, referring back to FIG. 1, any of clients 101-102 may further include storage software 151-152 having at least a portion of functionalities of storage server 104. Storage software 151-152 may further include deduplication logic configured to perform local deduplication operations, respectively. For example, prior to transmit data to storage system 104, each of clients 101-102 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, the deduplication logic of client 101 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

In one embodiment, cloud GW 170 is a network appliance or server which resides at the customer premises and translates cloud storage APIs such as simple object access protocol (SOAP) or REST to block-based storage protocols such as iSCSI or Fibre Channel or file-based interfaces such as NFS or CIFS. Cloud GW 170 can also serve as intermediaries to multiple cloud storage providers. Cloud GW 170 can also include additional storage features such as backup and recovery, caching, compression, encryption, storage deduplication and provisioning.

In one embodiment, cloud GW 170 maintains cloud backup interface 180, while storage server 104 also maintains counterpart cloud backup interface 130, to allow cloud GW 170 to communicate with cloud storage server 104 in a vendor neutral manner. That is the communications between cloud GW 170 and storage server 104 are performed in a format all cloud storage servers agree upon, as part of open communication protocol. As long as all of the cloud storage providers implement the same cloud backup protocol, clients 101-102 would not have to lock in with a particular cloud storage provider. The communications between clients 101-102 and cloud GW 170 may be proprietary or open communications.

In one embodiment, when a file is backed up from clients 101-102 to cloud storage server 104, a cloud backup descriptor (also simply referred to as a backup descriptor or just descriptor) is utilized to specify how the file should be backed up and whether the file is a full backup or an incremental backup, etc. A cloud backup descriptor includes a list of tags that clients 101-102 and/or cloud GW 170 can specify a particular manner in which a particular backup should be performed. The file and the backup descriptor are then transmitted to cloud storage server 104 via the common interfaces 180 and 130, where the file is then handled by storage service logic 106 based on the description specified by the tags within the backup descriptor. It is up to cloud storage server 104 to interpret the descriptor and to perform appropriate operations to complete the requested services, where the operations may be performed in a vendor dependent manner.

As a result, as long as the cloud storage providers implement such an open interface, any client can utilize cloud-based backup and restoration services from any cloud storage providers, as the communications between them are compatible with an open and vendor neutral communication protocol or format. A client does not have to install the proprietary backup software from a cloud storage provider. A client can simply fill in the descriptor according to a specification of the descriptor and tags, which may be in a script format, such as an extensible markup language (XML), and then send the file representing the incremental backup and the descriptor to cloud GW 170. Cloud GW 170 in turns communicates with cloud storage server 104 via cloud backup interface 180. Note that cloud GW 170 is configured to communicate with multiple cloud storage servers provided by different cloud storage providers using the same communication protocol.

Figure 2A:
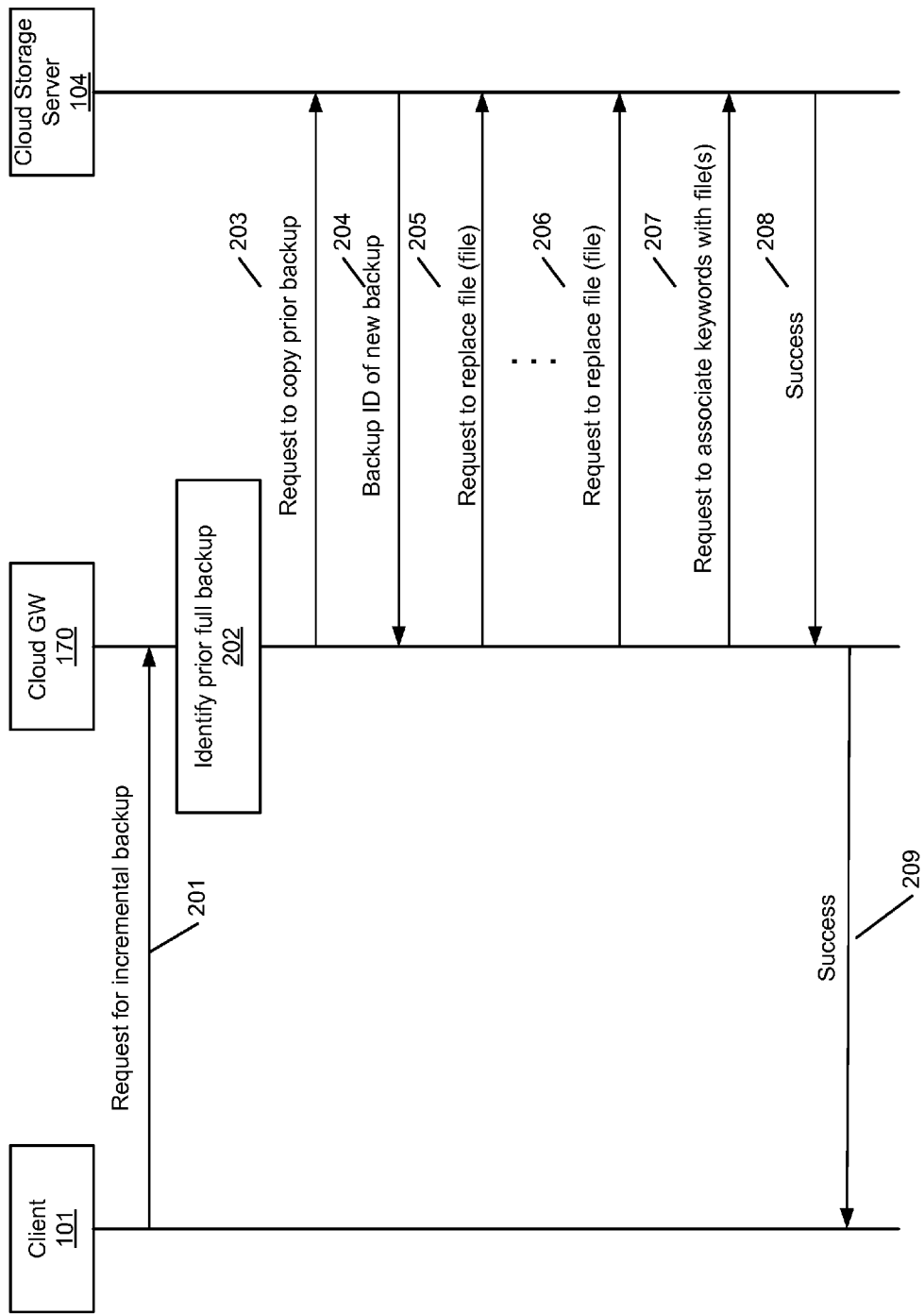
FIG. 2A is a transaction diagram illustrating a cloud-based backup operation according to one embodiment of the invention.

FIG. 2A is a transaction diagram illustrating a cloud-based backup operation according to one embodiment of the invention. Referring to FIG. 2A, at transaction 201, client sends a request for incremental backup to cloud GW 170. The request may include one or more files representing the incremental backup, as well as a backup descriptor having a list of one or more tags describing the incremental backup. In response at transaction 202, cloud GW 170 identifies the prior full backup based on the backup descriptor. Cloud GW 170 sends a request via transaction 203 to cloud storage server 104 to request copying a prior base backup (e.g., a first base backup) into a new base backup (e.g., a second base backup). The request may include a backup identifier identifying the prior base backup. In response, cloud storage server 104 identifies the prior base backup based on the backup ID received from cloud GW 170 and copies the prior based backup into a new backup.

Cloud storage server 104 returns a backup identifier identifying the new base backup that has been created at cloud storage server 104 by copying from the prior backup. At transactions 205-206, cloud GW 170 sends a request to replace a file of the new base backup and a backup identifier identifying the new base backup, which was received from cloud storage server 104 via transaction 204. The request further includes a descriptor having a list of one or more tags specifying which of the files and how the file should be replaced. In one embodiment, cloud GW 170 sends the request for each of the files to be replaced. Optionally, a list of keywords may be associated with a particular file or files via transaction 207, for example, for searching purposes subsequently. Once the success acknowledgement is received from cloud storage server 104 via transaction 208, cloud GW 170 returns the status back to client 101 via transaction 209.

In one embodiment, the information exchanged between cloud GW 170 and cloud storage server 104 may be encrypted for security reasons. The replacement files represent the incremental backup. Thus, by replacing the specific files, a new full backup has been created. Cloud storage server 104 may further perform any proprietary operations, such as, for example, segmenting the files into segments and deduplicate the segments into deduplicated segments before storing them in a storage device. However, these operations are all internal to cloud storage server 104 and would not affect or require client 101 to lock in with the cloud storage provider, because the communications between cloud GW 170 and cloud storage server 104 are open communications.

The above backup operation is also referred to as a synthetic backup. Synthetic backup is the process of generating a file from a complete copy of a file created at some past time and one or more incremental copies created at later times. The expression "synthetic" in this context refers to the fact that the assembled file is not a direct copy of any single current or previously created file. Instead, a synthetic file is merged or "synthesized" by a specialized application from the original file and one or more modifications to it.

Figure 2B:
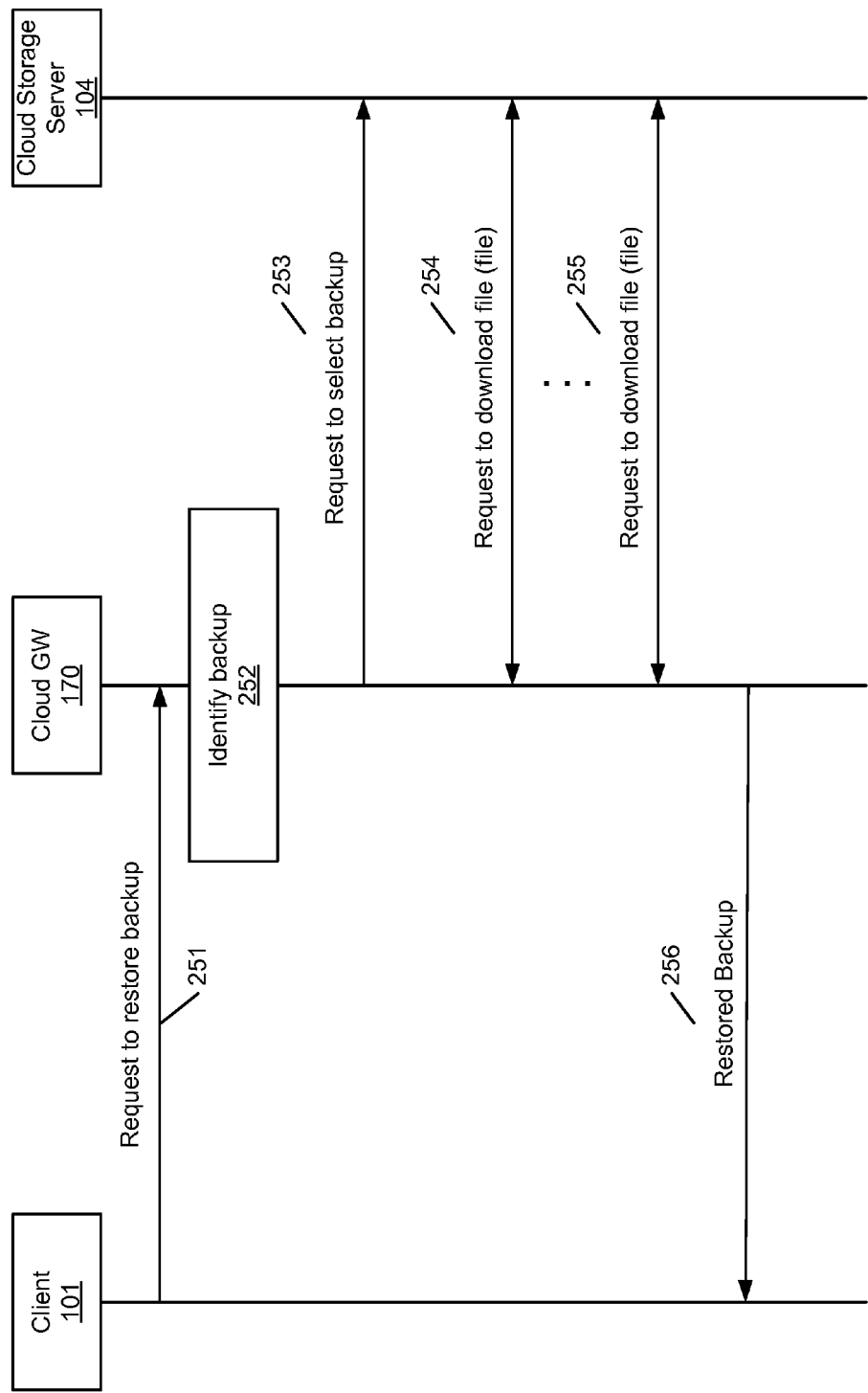
FIG. 2B is a transaction diagram illustrating a cloud-based restoration operation according to one embodiment of the invention.

FIG. 2B is a transaction diagram illustrating a cloud-based restoration operation according to one embodiment of the invention. Referring to FIG. 2B, at transaction 251, client 101 sends a request to restore a backup, where the request includes a descriptor having a list of one or more tags describing the backup to be restored. The tags may specify the name of a file system, version, backup date, etc. that collectively represent a backup to be restored. Based on the tags, at transaction 253, cloud GW 170 examines the descriptor to identify the backup to be restored. Note that cloud GW 170 cached locally the descriptors of prior backups. By comparing the tag information, cloud GW 170 can identify the backup to be restored. At transaction 253, cloud GW 170 sends a request to restore or select a backup to cloud storage server. The request may include a backup identifier that uniquely identifies a backup stored in cloud storage server 104. Alternatively, the request may include a descriptor having a list of one or more tags describing the backup to be restored. In response, cloud storage server 104 identifies a prior backup based on the information received from cloud GW 170. Thereafter, via transactions 254-255, cloud storage server 104 sends the files of the requested backup. If the files were segmented and deduplicated during the backup time, cloud storage server 104 reconstructs the files based on the metadata of the files, which may be proprietary operations. Via transaction 256, cloud GW 170 sends the files of the requested backup to client 101.

Figure 3:
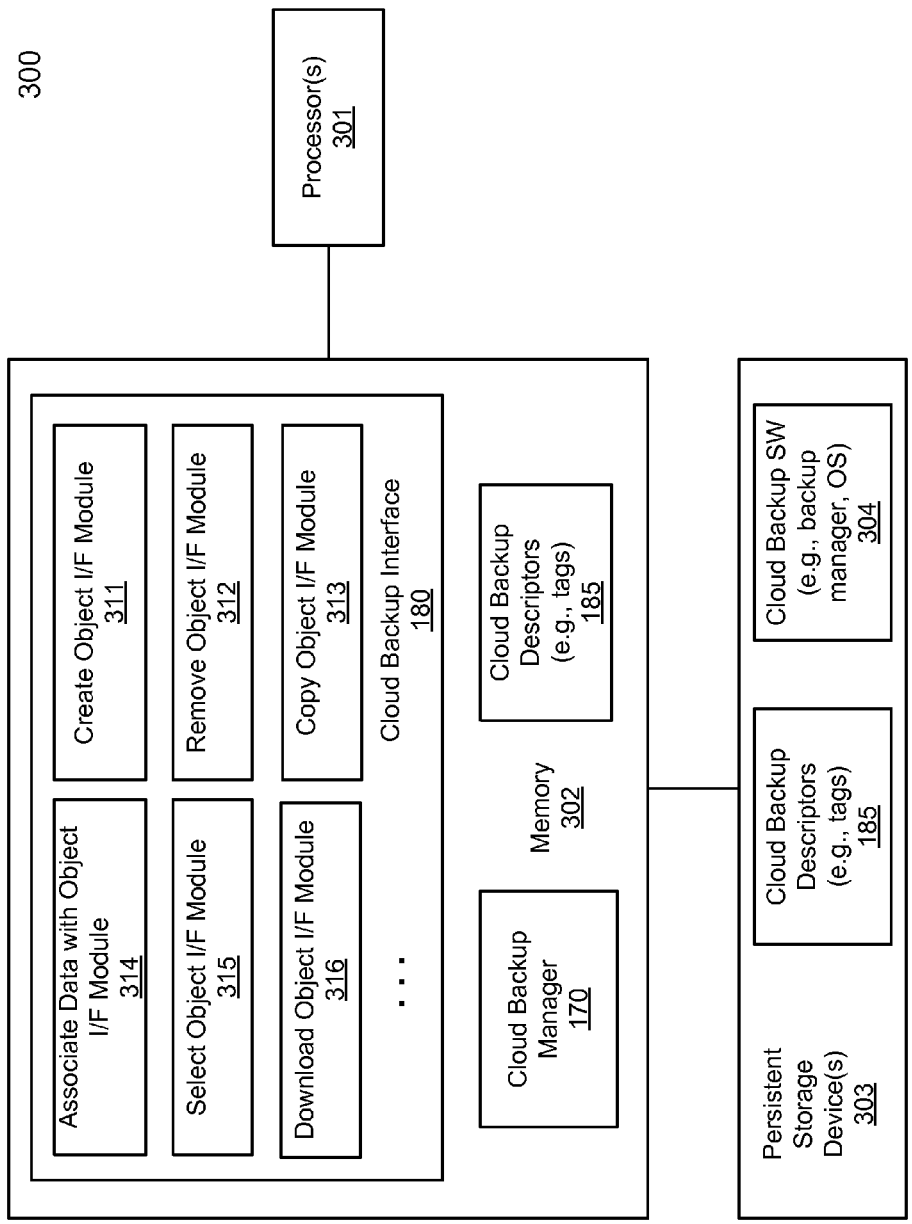
FIG. 3 is a block diagram illustrating an example of a cloud gateway device according to one embodiment of the invention.

FIG. 3 is a block diagram illustrating an example of a cloud gateway device according to one embodiment of the invention. Cloud GW 300 may represent cloud GW 170 of FIG. 1. Referring to FIG. 3, cloud GW 300 includes, but is not limited to, cloud backup manager 175, cloud backup interface 180, and cloud backup descriptors 185 loaded into memory 302 from persistent storage device 303 (as part of storage software 304) and executed by one or more processors 301. Memory 302 may be any kind of volatile memory, such as random access memory (RAM) as part of the system memory of system 300. Persistent storage device 303 may be any kind of non-volatile storage devices, such as hard disks, flash memory devices, solid state storage devices, etc. System 300 may further include other components well known in the art, such as, for example, an operating system, network interface device, etc.

In one embodiment, cloud backup interface 180 includes multiple cloud backup interface modules 311-316 and each of cloud backup interface modules is configured to handle a specific communication with a counterpart interface module (e.g., interface module 130 of cloud storage server 104 of FIG. 1) of a remote cloud storage server for a specific purpose. In one embodiment, cloud backup interface 180 includes, amongst others, create object interface module 311, remove object interface module 312, copy object interface module 313, associate data with object interface module 314, select object interface module 315, and download object interface module 316.

Note that for the purpose of illustration, these interfaces will be described as an example of an application programming interface (API). In a cloud space, the communications between two end points are client-server communications over a network. In client-server communication infrastructure, a client initiates a communication session by sending a request to a server component and the sever component respond by sending a response back to the client, either as an acknowledgement or data requested by the client. A device can be either a client and/or a server dependent upon the specific situation.

In one embodiment, create object interface module 311 is responsible for communicating with a remote counterpart interface module to create an object, which may be a root object or a child object under a parent object. Create object interface 311 may be represented as follows:

New object ID=create_object (parent_object_id, *descriptor)

If a root object is created, the parent object ID may be set to a predetermined value (e.g., NULL). As a parameter, a pointer of a descriptor referencing a descriptor that includes one or more tags having information specifying how the new object is created. An example of a descriptor is shown in FIG. 4 for the purposes of illustration. Alternatively, a client can simply pass the tags as the actual parameters in the request. An object herein refers to a node of a metadata tree representing a backup, where a node can be a file, a directory of one or more files, an entire file system, or a storage volume, etc. Alternatively, an object represents the actual file, a directory, file system, or volume in the backup.

Again, although the interface has been described in an API format, in a client-server configuration, it would require a client to send one or more network packets (e.g., TCP/IP packets) encapsulating the information of create_object (parent object ID, descriptor) to a server over a network (e.g., the Internet). In response, the server performs one or more actions (e.g., standard and/or proprietary operations)

based on the information in the packets, in this example, creating a new object in a manner described by the descriptor or tags. The server then returns a new object ID corresponding to the new object in another network packet or packets as a response to the request back to the client as a reference. The server may return the descriptor that has been modified to include a tag having the new object ID. Subsequently, the client can use the new object ID as a reference to access the new object stored in the server.

In one embodiment, remove object interface module 312 is responsible for communicating with a remote counterpart interface module to remove an object, which may be a root object or a child object under a parent object. Remove object interface 312 may be represented as follows:

Status=remove_object (parent_object_id, *descriptor)

If a root object is to be removed, the parent object ID may be set to a predetermined value (e.g., NULL). The descriptor includes one or more tags having information specifying which object is to be removed. In response to the request, the server searches and identifies an object based on the descriptor and/or the parent object ID, and removes the object from the backup tree. The server may return a status (e.g., success or failure) back to the client. Alternatively, the remove object request may only pass the descriptor (which may include the parent object ID), where the descriptor includes sufficient information to allow the server to search and identify the object to be removed. The server may return a parent object ID of the removed object if the removed object is a child object; otherwise, the server may return NULL, indicating the removed object is a root object. This will allow the client subsequently to insert or create another object under the same parent object based on the returned parent object ID.

In one embodiment, copy object interface module 313 is responsible for communicating with a remote counterpart interface module to copy an object and its child objects if there is any to a new object or a tree of objects. The object may be a root object or a child object under a parent object. Copy object interface 313 may be represented as follows:

New object ID=copy_object (object_id, *descriptor)

Alternatively, the descriptor may include the object ID from which a copy is to be made. In response to the copy object request, the server searches and identifies the object and makes a copy of the object, as well as its child objects if the descriptor specifies, into a new object. A new object ID is generated and returned to the client. If the new object ID is NULL, it indicates that the request is denied or fails. The server may return the descriptor that has been modified to include a tag having the new object ID.

In one embodiment, associate data with object interface module 314 is responsible for communicating with a remote counterpart interface module to associate data (e.g., keywords) with an object. The object may be a root object or a child object under a parent object. Associate data with object interface 314 may be represented as follows:

Status=associate_data_with_object (object_id, *descriptor)

The descriptor includes the data to be associated with the object that is identified by the object ID. Alternatively, the descriptor further includes the object ID. In response, the server searches and identifies the object based on the object ID and/or descriptor. The server then stores (with optional deduplication) the data in a storage device and associates or links the data to the object.

In one embodiment, select object interface module 315 is responsible for communicating with a remote counterpart interface module to select an object. The object may be a root object or a child object under a parent object. Select object interface 315 may be represented as follows:

Status=select_object (*descriptor)

The descriptor includes sufficient information identifying the object to be selected. The server may return an object ID identifying the object with which the data is associated.

In one embodiment, download object interface module 316 is responsible for communicating with a remote counterpart interface module to download content associated with an object and optional content of its child object(s). The object may be a root object or a child object under a parent object. Download object interface 316 may be represented as follows:

Status=download_object (*descriptor)

The descriptor includes sufficient information identifying the object to be downloaded. Alternatively, the client may just pass the object identifier identifying the object if the client happens to know it.

Note that the above interfaces or commands can be utilized for a full backup and a subsequent incremental backup. For the purposes of illustration, during a full backup, a client system that is backed-up identifies each backup by one or more tags, which may be stored in a descriptor data structure as shown in FIG. 4. Some of the tags include, client-name, client-filesystem_identifier, backup_date, group-of-the-client, etc. When backing up a file system such as file system named "/mnt1" from client named "client1" on the date of "21May2015" belonging to a group of "finance," the cloud GW would request the cloud storage server to create a backup object and associate it with tags: "/mnt1", "client1", "finance", and "21May2015". The new object can be created using create object interface 311 as described above. This is the first object or the root object of the backup that is getting created. This object is also referred to hereafter as "object1."

Now assuming this backup contains a directory "dir1" containing files "file1", "file2", . . . , "file100", the cloud gateway requests the cloud storage to create the following objects. The cloud GW requests the cloud storage server to create a new object as a child of the root backup object (object1 or the root object previously created) and associate the following tags with it: "dir1", "time-stamp", "permissions", "file1", "file2", "file3", . . . , "file100". This object is also referred to hereafter as "object2." The interface allows associating an object or a set of objects as children objects of another objects.

The cloud gateway requests the cloud storage to create a new object as a child of object2 and associate the following tags with the new object: "file1", "time_stamp", "permissions", "keyword1", "keyword2", "keyword3", "keyword4", . . . "keyword-n". This object is referred to as "object3." The cloud gateway requests the cloud storage to associate the data of file1 as data of object object3, for example, using associate data with object interface or command 314. The above operations are iteratively performed for the remaining objects to conclude the full backup of client1, for file system "mnt1" corresponding to "21May2015."

For a subsequent incremental backup, that changed file51, the cloud gateway sends the following commands to cloud storage. The cloud gateway requests the cloud storage to select an object identified by tags: "/mnt1", "client1", "finance", and "21May2015" using select object interface 315 and make a copy of the object and associate new tags with the copied object: "/mnt1", "client1", "finance", and "22May2015" using copy object interface 313. In response, the cloud storage server makes a copy all child objects associated with the old object1 and associates the copies with the new object1. This will make a copy of old objects, object2, object3, . . . object103, and associate the copied with new object1.

The cloud GW then selects the object with tags: "/mnt1", "client1", "finance", and "22May2015". Now the cloud GW selects the child object of the above selected object having tags: "dir1", "time-stamp", "permissions", "file1", "file2", "file3", . . . , "file100." From the selected object, the cloud GW can remove child object having tags: "file51", "time_stamp", "permissions", "keyword1", "keyword2", "keyword3", "keyword4", . . . "keyword-n" using remove object interface or command 312. The cloud gateway requests the cloud storage to create new child object having new tags: "file51", "new_time_stamp", "new_permissions", "keyword1", "keyword2", "keyword3", "keyword4", . . . "keyword-k". The cloud gateway requests the cloud storage to associate new data of file51 with the newly created object, and the backup session is completed.

The above commands would synthesize a new backup in the cloud from its previous backup by replacing file51 and its associated old data and old tags with the new data and new tags. The cloud gateway would also be able to select objects having certain keywords, such as selecting object having tags: "/mnt1", "client1", "finance", and "22May2015," searching all child objects that have tag: "keyword21," and downloading all objects and their tags that have the tag "keywork21." Note that some or all of the tags, keywords and object data would be encrypted before sending it over to cloud storage.

On the backup restoration, the cloud GW can use similar command to perform a restoration. For example, for a full restoration of a backup, the cloud GW can utilize the following interfaces or commands: 1) selecting object having tags: "/mnt1", "client1", "finance", and "22May2015" and 2) downloading all child object objects of the just selected object along with their tags using download object interface 316. For an incremental restoration, the cloud GW can utilize the following interfaces or commands: 1) selecting object having tags: "/mnt1", "client1", "finance", and "22May2015"; 2) searching child object having tag: "dir1"; 3) searching child object having tag: "file51"; and downloading that object along with its data and tags. For an incremental restore of a directory, the cloud GW can utilize the following commands: 1) selecting object having tags: "/mnt1", "client1", "finance", and "22May2015"; 2) searching child object having tag: "dir1"; and 3) downloading that object along with all its tags and also all its children objects and their respective tags.

Figure 5:
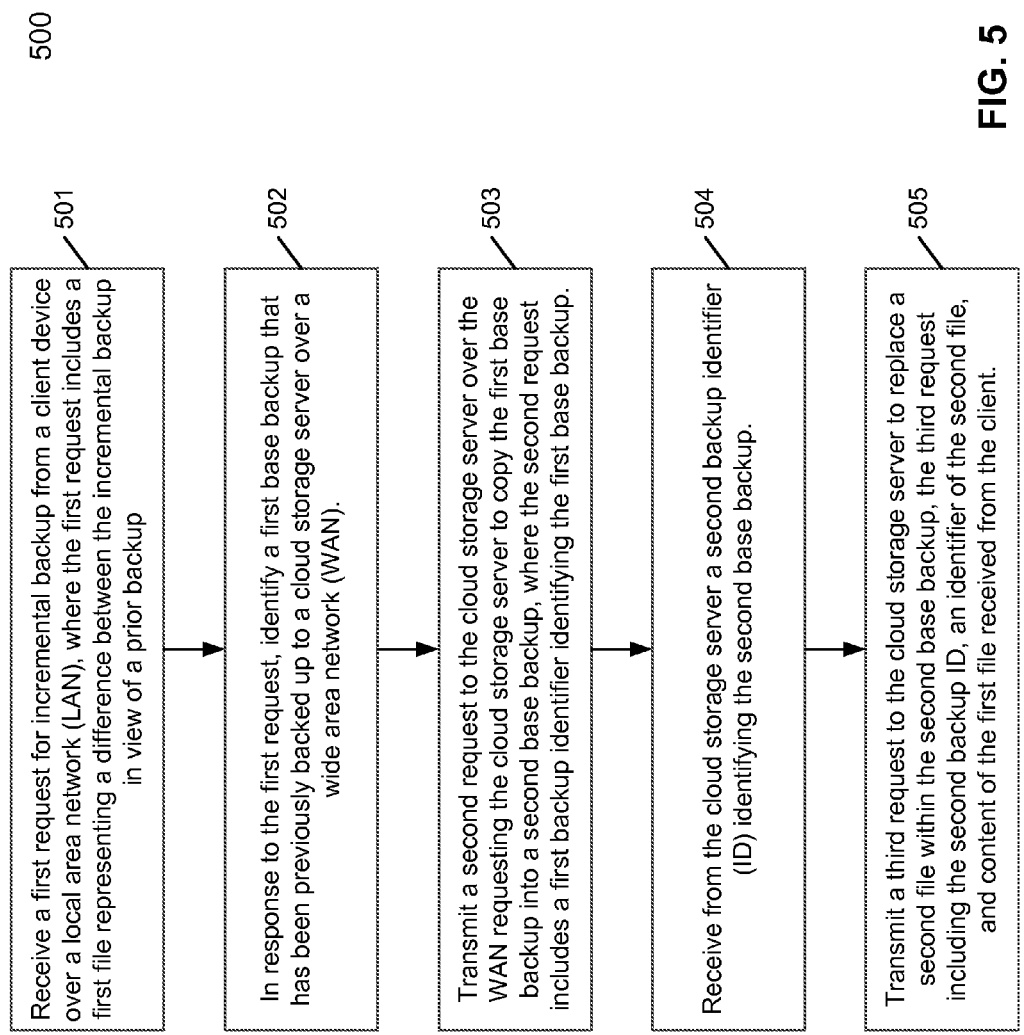
FIG. 5 is a flow diagram illustrating a process of cloud-based backup operations according to one embodiment of the invention.

FIG. 5 is a flow diagram illustrating a process of cloud-based backup operations according to one embodiment of the invention. Process 500 may be performed by processing logic which may include software, hardware, a virtual machine, or a combination thereof. For example, process 500 may be performed by cloud GW 170 of FIG. 1. Referring to FIG. 5, at block 501, processing logic receives a first request for an incremental backup from a client device over a LAN. The first request includes a first file representing a difference between the incremental backup in view of a prior backup. In response to the first request, at block 502, processing logic identifies a first base backup that has been previously backed up to a cloud storage server over a WAN. At block 503, processing logic transmits a second request to the cloud storage server over the WAN to request the cloud storage server to copy the first base backup into a second base backup. The second request includes a first backup identifier identifying the first base backup. At block 504, processing logic receives a second backup identifier from the cloud storage server, where the second backup identifier identifies the second base backup that has been copied from the first base backup. At block 505, processing logic transmits a third request to the cloud storage server to replace a second file within the second base backup. The third request includes the second backup ID, an identifier identifying the second file, and content of the first file received from the client.

Figure 6:
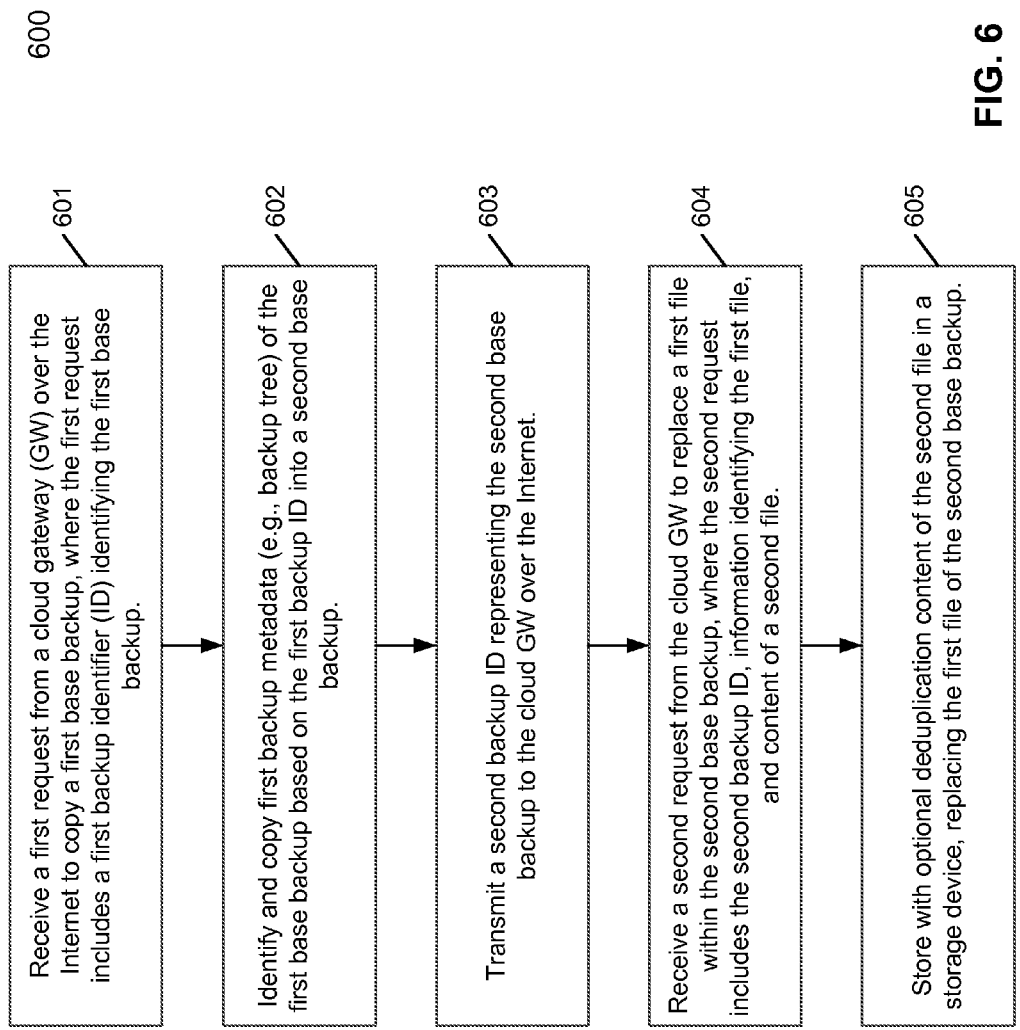
FIG. 6 is a flow diagram illustrating a process of cloud-based backup operations according to another embodiment of the invention.

FIG. 6 is a flow diagram illustrating a process of cloud-based backup operations according to another embodiment of the invention. Process 600 may be performed by processing logic which may include software, hardware, a virtual machine, or a combination thereof. For example, process 600 may be performed by cloud storage server 104 of FIG. 1. Referring to FIG. 6, at block 601, processing logic receives a first request from a cloud GW over the Internet to copy a first base backup. The first request includes information, such as, a first backup identifier, identifying the first base backup. In response to the first request, at block 602, processing logic identifies and copies the first base backup based on the information received from the cloud GW into a second base backup. At block 603, processing logic transmits a second backup identifier representing the second base backup to the cloud GW over the Internet. At block 604, processing logic receives a second request from the cloud GW to replace a first file within the second base backup. The second request includes the second backup identifier, information identifying the first file, and content of a second file as a replacement file. In response to the second request, processing logic stores with optional deduplication the second file in a storage device, replacing the first file of the second base backup.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
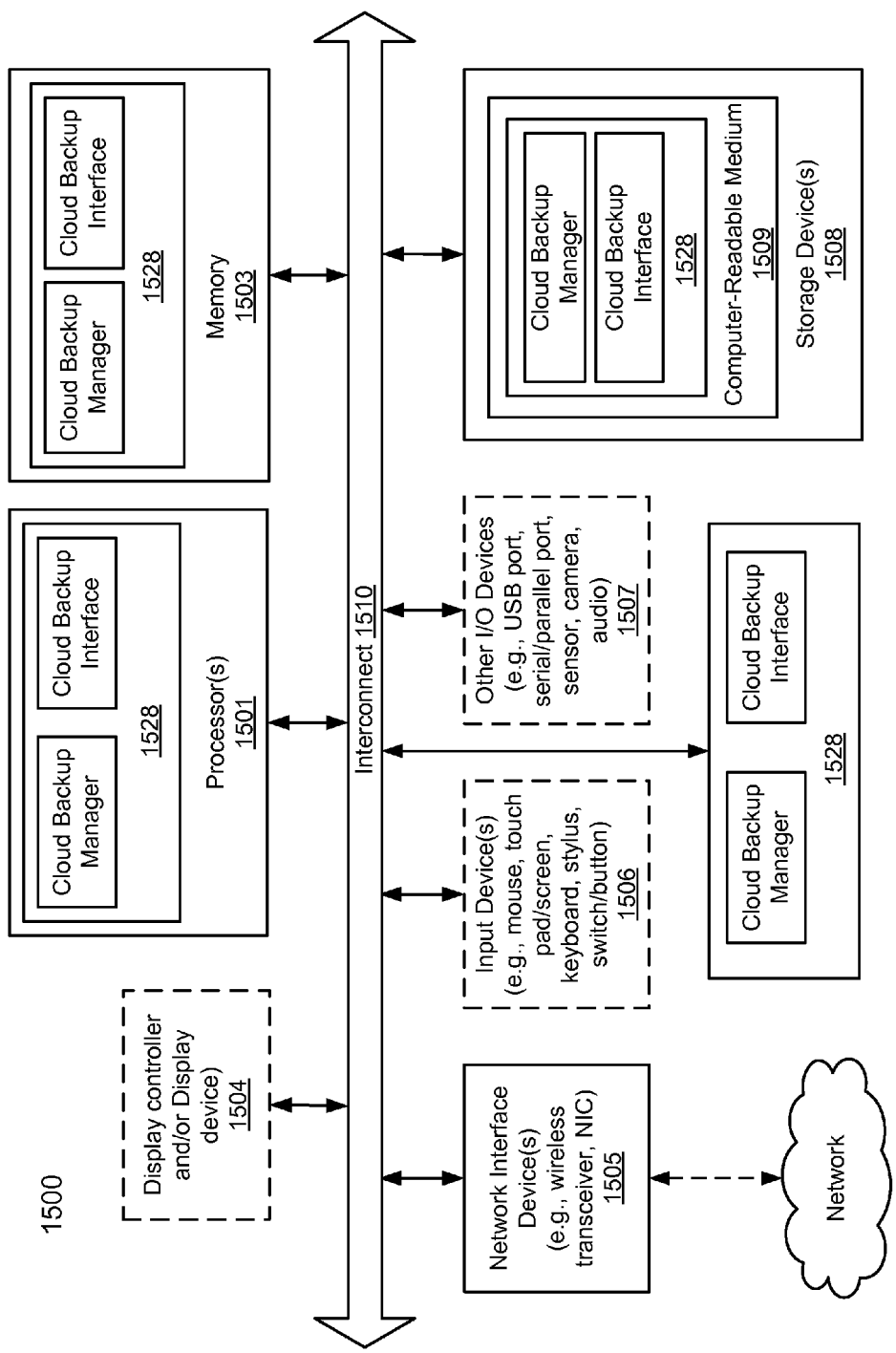
FIG. 7 is a block diagram illustrating a data processing system according to one embodiment.

FIG. 7 is a block diagram illustrating an example of a data processing system which may be used with one embodiment of the invention. For example, system 1500 may represents any of data processing systems described above performing any of the processes or methods described above, such as cloud GW 170, any of clients 101-102, cloud storage server 104, or management server 160 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components. Module/unit/logic 1528 may represent any of the modules or logic described above, such as a cloud backup manager and/or cloud backup interface of a cloud GW represented by system 1500. Alternatively, Module/unit/logic 1528 may represent storage service logic, deduplication logic, and/or a virtualization layer of a cloud storage server represented by system 1500.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for cloud-based backup, the method comprising:
   receiving, at a cloud gateway (GW) device which manages backups and restores to and from cloud storage servers of two or more cloud storage providers, a first request for incremental backup from a client device over a local area network (LAN), wherein the first request includes a first file representing a difference between the incremental backup in view of a prior backup;
   in response to the first request, identifying by a cloud backup manager running within the cloud GW, a first base backup that has been previously backed up to a cloud storage server over a wide area network (WAN), including constructing a first descriptor having a plurality of tags to specify the first base backup, the plurality of tags including a client tag identifying the client, a file system tag identifying a file system associated with the first base backup, and a timestamp tag indicating time at which the first base backup was made;
   transmitting a second request to the cloud storage server over the WAN requesting the cloud storage server to copy the first base backup into a second base backup, wherein the second request includes a first backup identifier (ID) identifying the first base backup and wherein the second request is transmitted by at least transmitting a first command to the cloud storage server to select a root object of the first base backup, the first command including the first descriptor, wherein the first backup ID is represented by the first descriptor, wherein the cloud storage server selects the first base backup based on the first descriptor; and transmitting a third request to the cloud storage server over the WAN to replace a second file within the second base backup, the third request including a second backup ID identifying the second base backup, a descriptor describing which of a plurality of files of the second base backup to be replaced, and content of the file received from the client such that a backup would not have to be locked-in with a particular cloud storage provider.

2. The method of claim 1, wherein transmitting a second request to the cloud storage server comprises:

transmitting a second command to the cloud storage server to copy the selected first base backup into the second base backup, wherein the cloud storage server copies the selected root object and a plurality of child objects to create the second base backup.

3. The method of claim 2, wherein transmitting a third request to the cloud storage server over the WAN to replace a file comprises:

constructing a second descriptor having a plurality of tags to specify the second file of the second base backup;

transmitting a third command to the cloud storage server to select a second object representing the second file of the second base backup, wherein the third command includes the second descriptor; and transmitting a fourth command to the cloud storage server to remove the selected second object representing the second file from the second base backup.

4. The method of claim 3, further comprising:

transmitting a fifth command to the cloud storage server to create a third object, the fifth command including a third descriptor having a plurality of tags to identify a parent object of the removed second object in the second base backup, wherein the third object is created as a child object to the parent object; and transmitting a sixth command to the cloud storage server to associate content of the first file to the third object.

5. The method of claim 1, further comprising:

receiving a fourth request from the client to restore a second incremental backup, the fourth request including a directory identifier of a directory representing the second incremental backup;

in response to the fourth request, transmitting a second command to the cloud storage server to select a root object of a third base backup, the second command including one or more tags identifying the root object of the third base backup;

transmitting a third command to the cloud storage server to select a directory object representing the directory of the third base backup, the third command including one or more tags specifying the directory identifier;

transmitting a fourth command to the cloud storage server to download data associated with a plurality of child objects of the directory object; and transmitting the data to the client over the LAN.

6. The method of claim 5, further comprising:

receiving a first identifier identifying the root object of the third base backup from the cloud storage server in response to the second command, wherein the third command includes the first identifier to identifier a parent object to the directory object; and receiving a second identifier identifying the directory object from the cloud storage server in response to the third command, wherein the fourth command includes the second identifier to identify the directory object.

7. A non-transitory machine-readable medium having instructions stored therein, which when executed by a processor, cause the processor to perform operations of cloud-based backup, the operations comprising:

receiving, at a cloud gateway (GW) device which manages backups and restores to and from cloud storage servers of two or more cloud storage providers, a first request for incremental backup from a client device over a local area network (LAN), wherein the first request includes a first file representing a difference between the incremental backup in view of a prior backup;

in response to the first request, identifying by a cloud backup manager running within the cloud GW, a first base backup that has been previously backed up to a cloud storage server over a wide area network (WAN), including constructing a first descriptor having a plurality of tags to specify the first base backup, the plurality of tags including a client tag identifying the client, a file system tag identifying a file system associated with the first base backup, and a timestamp tag indicating time at which the first base backup was made;

transmitting a second request to the cloud storage server over the WAN requesting the cloud storage server to copy the first base backup into a second base backup, wherein the second request includes a first backup identifier (ID) identifying the first base backup and wherein the second request is transmitted by at least transmitting a first command to the cloud storage server to select a root object of the first base backup, the first command including the first descriptor, wherein the first backup ID is represented by the first descriptor, wherein the cloud storage server selects the first base backup based on the first descriptor; and transmitting a third request to the cloud storage server over the WAN to replace a second file within the second base backup, the third request including a second backup ID identifying the second base backup, a descriptor describing which of a plurality of files of the second base backup to be replaced, and content of the file received from the client such that a backup would not have to be locked-in with a particular cloud storage provider.

8. The non-transitory machine-readable medium of claim 7, wherein transmitting a second request to the cloud storage server comprises:

transmitting a second command to the cloud storage server to copy the selected first base backup into the second base backup, wherein the cloud storage server copies the selected root object and a plurality of child objects to create the second base backup.

9. The non-transitory machine-readable medium of claim 8, wherein transmitting a third request to the cloud storage server over the WAN to replace a file comprises:

constructing a second descriptor having a plurality of tags to specify the second file of the second base backup;

transmitting a third command to the cloud storage server to select a second object representing the second file of the second base backup, wherein the third command includes the second descriptor; and transmitting a fourth command to the cloud storage server to remove the selected second object representing the second file from the second base backup.

10. The non-transitory machine-readable medium of claim 9, wherein the operations further comprise:
   transmitting a fifth command to the cloud storage server to create a third object, the fifth command including a third descriptor having a plurality of tags to identify a parent object of the removed second object in the second base backup, wherein the third object is created as a child object to the parent object; and
   transmitting a sixth command to the cloud storage server to associate content of the first file to the third object.

11. The non-transitory machine-readable medium of claim 7, wherein the operations further comprise:
   receiving a fourth request from the client to restore a second incremental backup, the fourth request including a directory identifier of a directory representing the second incremental backup;
   in response to the fourth request, transmitting a second command to the cloud storage server to select a root object of a third base backup, the second command including one or more tags identifying the root object of the third base backup;
   transmitting a third command to the cloud storage server to select a directory object representing the directory of the third base backup, the third command including one or more tags specifying the directory identifier;
   transmitting a fourth command to the cloud storage server to download data associated with a plurality of child objects of the directory object; and
   transmitting the data to the client over the LAN.

12. The non-transitory machine-readable medium of claim 11, wherein the operations further comprise:
   receiving a first identifier identifying the root object of the third base backup from the cloud storage server in response to the second command, wherein the third command includes the first identifier to identifier a parent object to the directory object; and
   receiving a second identifier identifying the directory object from the cloud storage server in response to the third command, wherein the fourth command includes the second identifier to identify the directory object.

13. A cloud gateway (GW) device which manages backups and restores to and from cloud storage servers of two or more cloud storage providers, comprising:
   a processor; and
   a memory coupled to the processor storing instructions, which when executed by the processor, cause the processor to perform operations, the operations including
      receiving a first request for incremental backup from a client device over a local area network (LAN), wherein the first request includes a first file representing a difference between the incremental backup in view of a prior backup,
      in response to the first request, identifying a first base backup that has been previously backed up to a cloud storage server over a wide area network (WAN), including constructing a first descriptor having a plurality of tags to specify the first base backup, the plurality of tags including a client tag identifying the client, a file system tag identifying a file system associated with the first base backup, and a timestamp tag indicating time at which the first base backup was made,
      transmitting a second request to the cloud storage server over the WAN requesting the cloud storage server to copy the first base backup into a second base backup, wherein the second request includes a first backup identifier (ID) identifying the first base backup and wherein the second request is transmitted by at least transmitting a first command to the cloud storage server to select a root object of the first base backup, the first command including the first descriptor, wherein the first backup ID is represented by the first descriptor, wherein the cloud storage server selects the first base backup based on the first descriptor, and
      transmitting a third request to the cloud storage server over the WAN to replace a second file within the second base backup, the third request including a second backup ID identifying the second base backup, a descriptor describing which of a plurality of files of the second base backup to be replaced, and content of the file received from the client such that a backup would not have to be locked-in with a particular cloud storage provider.

14. The system of claim 13, wherein transmitting a second request to the cloud storage server comprises:
   transmitting a second command to the cloud storage server to copy the selected first base backup into the second base backup, wherein the cloud storage server copies the selected root object and a plurality of child objects to create the second base backup.

15. The system of claim 14, wherein transmitting a third request to the cloud storage server over the WAN to replace a file comprises:
   constructing a second descriptor having a plurality of tags to specify the second file of the second base backup;
   transmitting a third command to the cloud storage server to select a second object representing the second file of the second base backup, wherein the third command includes the second descriptor; and
   transmitting a fourth command to the cloud storage server to remove the selected second object representing the second file from the second base backup.

16. The system of claim 15, wherein the operations further comprise:
   transmitting a fifth command to the cloud storage server to create a third object, the fifth command including a third descriptor having a plurality of tags to identify a parent object of the removed second object in the second base backup, wherein the third object is created as a child object to the parent object; and
   transmitting a sixth command to the cloud storage server to associate content of the first file to the third object.

17. The system of claim 13, wherein the operations further comprise:
   receiving a fourth request from the client to restore a second incremental backup, the fourth request including a directory identifier of a directory representing the second incremental backup;
   in response to the fourth request, transmitting a second command to the cloud storage server to select a root object of a third base backup, the second command including one or more tags identifying the root object of the third base backup;
   transmitting a third command to the cloud storage server to select a directory object representing the directory of the third base backup, the third command including one or more tags specifying the directory identifier;
   transmitting a fourth command to the cloud storage server to download data associated with a plurality of child objects of the directory object; and
   transmitting the data to the client over the LAN.

18. The system of claim 17, wherein the operations further comprise:

receiving a first identifier identifying the root object of the third base backup from the cloud storage server in response to the second command, wherein the third command includes the first identifier to identifier a parent object to the directory object; and receiving a second identifier identifying the directory object from the cloud storage server in response to the third command, wherein the fourth command includes the second identifier to identify the directory object.

\* \* \* \* \*